United States Patent
Wu et al.

(10) Patent No.: US 8,465,072 B2
(45) Date of Patent: Jun. 18, 2013

(54) PANEL TRANSFERRING APPARATUS AND PANEL SUPPORTING MECHANISM THEREOF

(75) Inventors: Jo Shan Wu, Shenzhen (CN); Kuan-Cheng Lee, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/375,465

(22) PCT Filed: Jun. 3, 2011

(86) PCT No.: PCT/CN2011/075353
§ 371 (c)(1),
(2), (4) Date: Nov. 30, 2011

(87) PCT Pub. No.: WO2012/159278
PCT Pub. Date: Nov. 29, 2012

(65) Prior Publication Data
US 2012/0299319 A1    Nov. 29, 2012

(30) Foreign Application Priority Data

May 24, 2011    (CN) ...................... 2011 2 0168026 U

(51) Int. Cl.
*B65G 49/05* (2006.01)
*B25J 15/10* (2006.01)
(52) U.S. Cl.
USPC ............................ 294/213; 294/902; 414/941

(58) Field of Classification Search
USPC ................. 294/6, 7, 9, 32, 213, 902; D7/683, D7/690; 15/141.1; 414/941, 749.1, 749.01; 901/30, 32
See application file for complete search history.

(56) References Cited

U.S. PATENT DOCUMENTS

| | | | | |
|---|---|---|---|---|
| 2,697,627 | A * | 12/1954 | La Fond | 294/32 |
| D412,648 | S * | 8/1999 | Welk | D7/683 |
| 6,634,686 | B2 * | 10/2003 | Hosokawa | 294/213 |
| 6,746,062 | B2 * | 6/2004 | Bielecki et al. | 294/7 |
| 7,073,834 | B2 * | 7/2006 | Matsumoto et al. | 294/213 |
| 7,306,423 | B2 * | 12/2007 | Ogawa et al. | 414/749.1 |
| 7,520,545 | B2 * | 4/2009 | Kim | 294/902 |
| 7,751,939 | B2 * | 7/2010 | Cho et al. | 414/225.01 |
| D651,484 | S * | 1/2012 | Zemel | D7/683 |
| 2006/0216137 | A1 * | 9/2006 | Sakata et al. | 414/222.13 |

* cited by examiner

*Primary Examiner* — Paul T Chin
(74) *Attorney, Agent, or Firm* — Cheng-Ju Chiang

(57) ABSTRACT

The present invention discloses a panel transferring apparatus. The panel transferring apparatus includes a panel supporting mechanism for supporting a panel. The panel supporting mechanism includes a plurality of primary supports spaced apart from each other; and a plurality of secondary supports disposed on the primary supports and extending lateral to the primary supports. The primary supports and the secondary supports cooperate to support the panel. The present invention further discloses a panel supporting mechanism. A contact area between the panel supporting mechanism and the panel is increased by disposing the plurality of secondary supports on the plurality of primary supports. Thereby, flexure of the panel is lessened, the production cost is lowered and the production cycle is shortened.

13 Claims, 2 Drawing Sheets

PANEL TRANSFERRING APPARATUS AND PANEL SUPPORTING MECHANISM THEREOF

TECHNICAL FIELD

The present invention generally relates to the field of panel transferring, and more particularly, to a panel transferring apparatus and a panel supporting mechanism thereof.

BACKGROUND

Nowadays, owing to such advantages as lightweight, low-profile, low power consumption and free of radiation, liquid crystal displays (LCDs) have found wide application in various electronic products such as computers, TV sets, notebook computers, mobile phones and digital cameras. Panels are indispensable components to the LCDs, and thinner panels are more liable to flexure. Currently, a G8.5 panel generally has a thickness of 0.5 mm, and the minimum thickness of panels is 0.3 mm.

In the prior art, a panel transferring apparatus comprises a panel supporting mechanism for supporting a panel. The panel supporting mechanism comprises a plurality of bar-shaped supports spaced apart from each other. Because of a small contact area between the bar-shaped supports and the panel, the panel is liable to flexure during the transferring process; moreover, at the moment when the panel is put down or lifted up by the panel transferring apparatus, an inertia force tends to act on the panel to cause fracture of the panel, thus increasing the production cost and prolonging the production cycle.

Accordingly, an urgent need exists in the art to provide a panel transferring apparatus that can solve the problems of high production cost and long production cycle of panels caused by the prior art panel transferring apparatus.

SUMMARY OF THE INVENTION

The primary objective of the present invention is to provide a panel transferring apparatus and a panel supporting mechanism thereof that can lower the production cost and shorten the production cycle of panels.

To achieve the aforesaid objective, the present invention provides a panel transferring apparatus. The panel transferring apparatus comprises a panel supporting mechanism for supporting a panel. The panel supporting mechanism comprises: a plurality of primary supports extending in a first direction and spaced apart from each other in a second direction perpendicular to the first direction; and a plurality of secondary supports disposed on the primary supports and extending lateral to the primary supports in the second direction; wherein the primary supports and the secondary supports cooperate to support the panel, a plurality of the secondary supports are disposed at both sides of each of the primary supports, and the secondary supports disposed at a same side of each of the primary supports are spaced apart from each other.

According to a preferred embodiment of the present invention, a distance to which the secondary supports extend laterally is smaller than a spacing between the primary supports.

According to a preferred embodiment of the present invention, the panel supporting mechanism further comprises a fixing element, each of the primary supports comprises a free end and a fixed end opposite to each other, and the fixed end of the primary support is fixed to the fixing element.

According to a preferred embodiment of the present invention, each of the primary supports is tapered from the fixed end to the free end.

According to a preferred embodiment of the present invention, the panel transferring apparatus further comprises a drive mechanism which is pivotally connected to the fixing element to drive the panel supporting mechanism.

The present invention further provides a panel transferring apparatus, which comprises a panel supporting mechanism for supporting a panel. The panel supporting mechanism comprises a plurality of primary supports spaced apart from each other, and a plurality of secondary supports disposed on the primary supports and extending lateral to the primary supports, wherein the primary supports and the secondary supports cooperate to support the panel.

According to a preferred embodiment of the present invention, the plurality of primary supports extend in a first direction and are spaced apart from each other in a second direction perpendicular to the first direction, and the secondary supports extend lateral to the primary supports in the second direction.

According to a preferred embodiment of the present invention, a distance to which the secondary supports extend laterally is smaller than a spacing between the primary supports.

According to a preferred embodiment of the present invention, a plurality of the secondary supports are disposed at both sides of each of the primary supports, and the secondary supports disposed at a same side of each of the primary supports are spaced apart from each other.

According to a preferred embodiment of the present invention, the panel supporting mechanism further comprises a fixing element, each of the primary supports comprises a free end and a fixed end opposite to each other, and the fixed end of the primary support is fixed to the fixing element.

According to a preferred embodiment of the present invention, each of the primary supports is tapered from the fixed end to the free end.

According to a preferred embodiment of the present invention, the panel transferring apparatus further comprises a drive mechanism which is pivotally connected to the fixing element to drive the panel supporting mechanism.

The present invention further provides a panel supporting mechanism for supporting a panel, which comprises: a plurality of primary supports spaced apart from each other, and a plurality of secondary supports disposed on the primary supports and extending lateral to the primary supports, wherein the primary supports and the secondary supports cooperate to support the panel.

According to a preferred embodiment of the present invention, the plurality of primary supports extend in a first direction and are spaced apart from each other in a second direction perpendicular to the first direction, and the secondary supports extend lateral to the primary supports in the second direction.

According to a preferred embodiment of the present invention, a distance to which the secondary supports extend laterally is smaller than a spacing between the primary supports.

According to a preferred embodiment of the present invention, a plurality of the secondary supports are disposed at both sides of each of the primary supports, and the secondary supports disposed at a same side of each of the primary supports are spaced apart from each other.

According to a preferred embodiment of the present invention, the panel supporting mechanism further comprises a fixing element, each of the primary supports comprises a free end and a fixed end opposite to each other, and the fixed end of the primary support is fixed to the fixing element.

According to a preferred embodiment of the present invention, each of the primary supports is tapered from the fixed end to the free end.

The present invention has the following benefits: as compared to the prior art, the panel transferring apparatus and the panel supporting mechanism thereof of the present invention have a plurality of secondary supports disposed on the primary supports to increase a contact area between the panel supporting mechanism and the panel. This lessens the flexure of the panel, lowers the production cost and shortens the production cycle. Thereby, the competitive edge of the manufacturers is improved.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF EMBODIMENTS

Reference will now be made to the drawings to describe preferred and exemplary embodiments of the present invention in detail.

Figure 1:
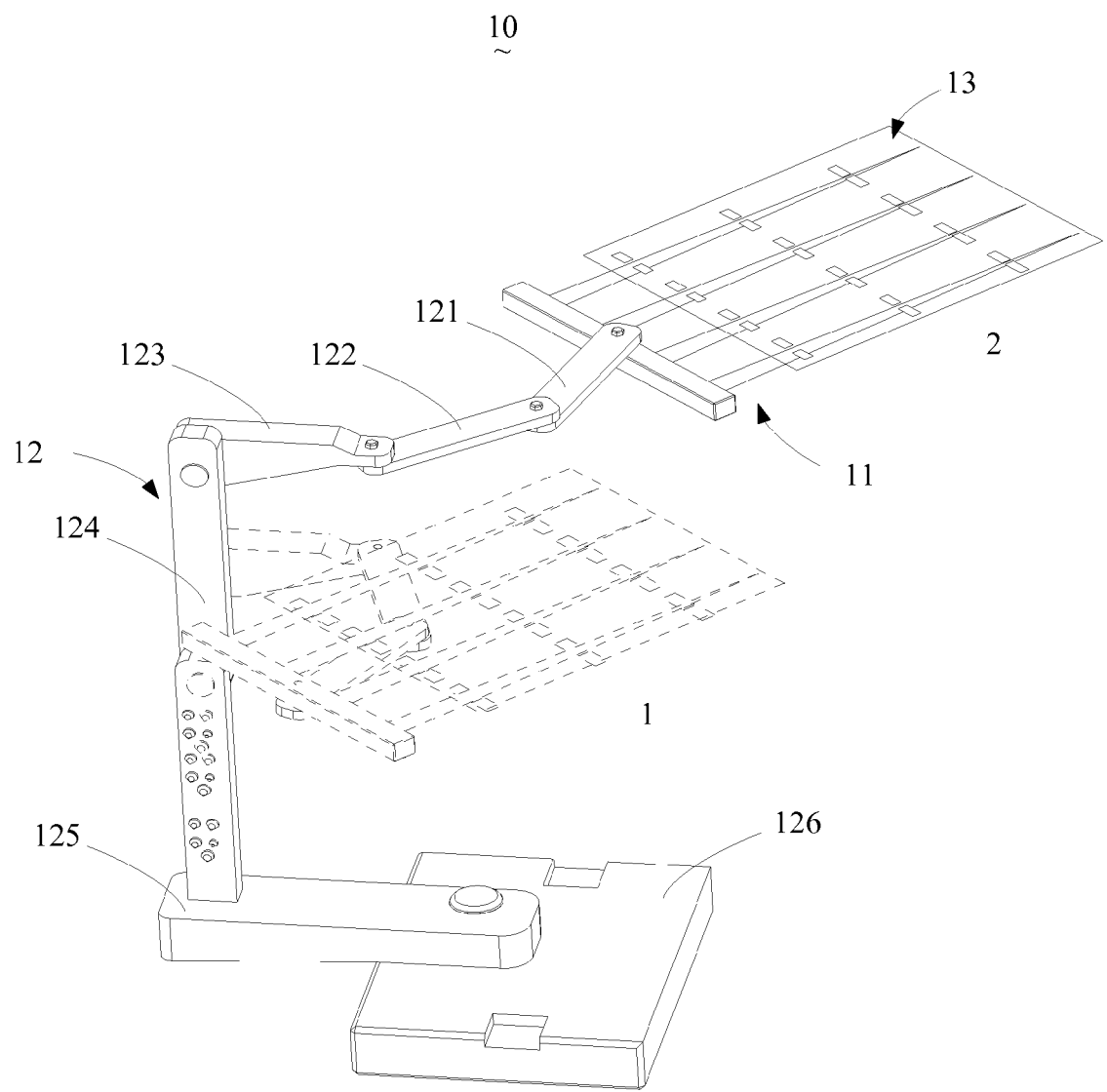
FIG. 1 is a schematic view illustrating the structure of a preferred embodiment of a panel transferring apparatus according to the present invention.
Figure 2:
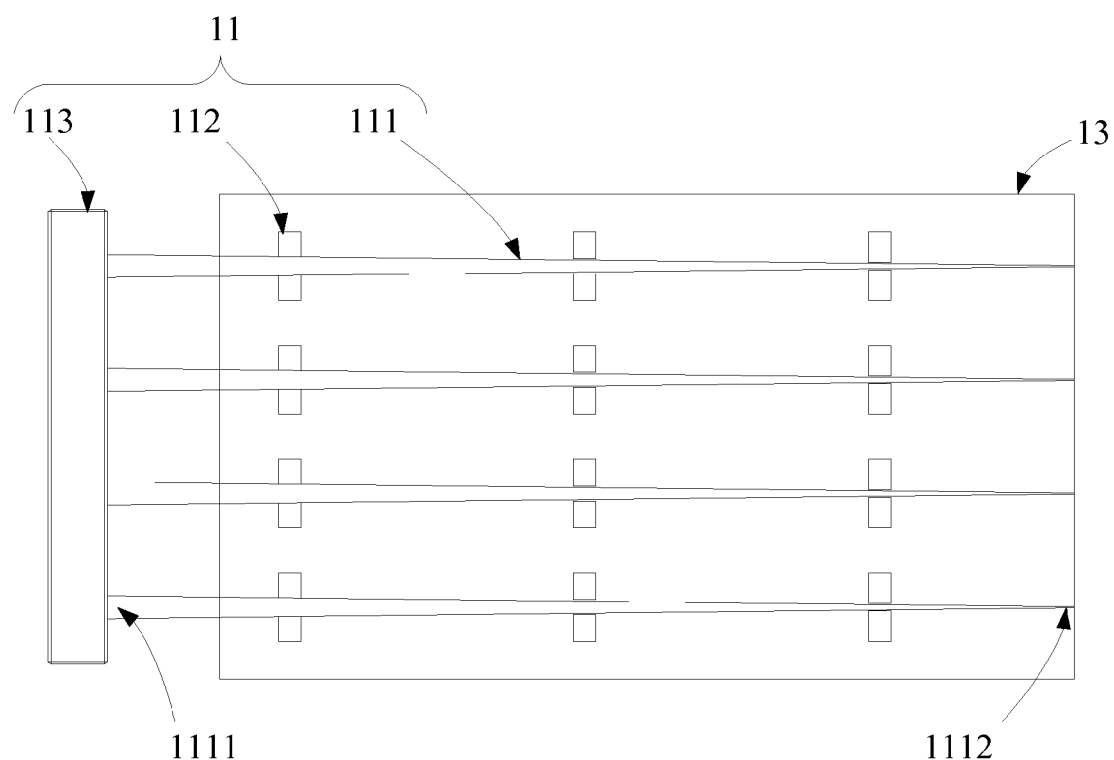
FIG. 2 is a schematic view illustrating the structure of a preferred embodiment of a panel supporting mechanism of the panel transferring apparatus according to the present invention.

Referring to FIG. 1 and FIG. 2, FIG. 1 is a schematic view illustrating the structure of a preferred embodiment of a panel transferring apparatus according to the present invention, and FIG. 2 is a schematic view illustrating the structure of a preferred embodiment of a panel supporting mechanism of the panel transferring apparatus according to the present invention. As shown in FIG. 1 and FIG. 2, a panel transferring apparatus 10 of the present invention comprises a panel supporting mechanism 11 and a drive mechanism 12. The panel supporting mechanism 11 is adapted to support a panel 13.

As shown in FIG. 2, in this embodiment, the panel supporting mechanism 11 comprises a plurality of primary supports 111, a plurality of secondary supports 112 and a fixing element 113. The plurality of primary supports 111 extend in a first direction and are spaced apart from each other. Each of the primary supports 111 further comprises a fixed end 1111 and a free end 1112. The primary support 111 is fixed to the fixing element 113 at the fixed end 1111, and the free end 1112 makes it convenient to put the panel 13 on the panel supporting mechanism 11. Each of the primary supports 111 is tapered from the fixed end 1111 to the free end 1112. The plurality of secondary supports 112 are disposed on the primary supports 111 and extend lateral to the primary supports 111 in a second direction perpendicular to the first direction. A distance to which the secondary supports 112 extend laterally is smaller than a spacing between the primary supports 111.

In the preferred embodiment, three secondary supports 112 are disposed on the primary supports 111; however, in other embodiments, a different number of secondary supports 112 may be disposed on the primary supports 111 to cooperate with the primary supports 111 to support the panel 13. Besides, in this embodiment, the plurality of primary supports 111 and the plurality of secondary supports 112 are preferably a plurality of separate elements; however, in other embodiments, the plurality of primary supports 111 and the plurality of secondary supports 112 may be integrally formed.

In FIG. 2, the first direction is the horizontal direction. However, those skilled in the art will appreciate that the first direction may also be other directions when the panel transferring apparatus 10 is placed in other orientations. In addition, a different angle may be included between the first direction and the second direction in other embodiments.

Referring to FIG. 1, the drive mechanism 12 is connected to the fixing element 113 to drive the panel supporting mechanism 11. The drive mechanism 12 further comprises a first drive element 121, a second drive element 122, a third drive element 123, a fourth drive element 124, a fifth drive element 125 and a supporting platform 126. One end of the first drive element 121 is pivotally connected to the fixing element 113 to swing the panel supporting mechanism 11 leftwards and rightwards horizontally; one end of the second drive element 122 is pivotally connected to the other end of the first drive element 121 to swing the first drive element 121 leftwards and rightwards horizontally; and one end of the third drive element 123 is pivotally connected to the other end of the second drive element 122 to swing the second drive element 122 leftwards and rightwards horizontally. By means of the first drive element 121, the second drive element 122, and the third drive element 123, the drive mechanism 12 controls the panel supporting mechanism 11 to drive the panel 13 from position 1 to position 2. One end of the fourth drive element 124 is pivotally connected to the other end of third drive element 123 to swing the third drive element 123 up and down vertically; one end of the L-shaped fifth drive element 125 is pivotally connected to the other end of the fourth drive element 124 to swing the fourth drive element 124 up and down vertically; and the other end of the L-shaped fifth drive element 125 is pivotally connected to the supporting platform 126 to swing the drive mechanism 12 leftwards and rightwards horizontally. The panel transferring apparatus 10 further comprises a control module (not shown), which is electrically connected to the drive mechanism 12 to control the swinging movement of the drive elements of the drive mechanism 12.

In use of the panel transferring apparatus 10, firstly the control module controls the drive mechanism 12 and the panel supporting mechanism 11 to support the panel 13 on the panel supporting mechanism 11, with the panel 13 being supported on the plurality of primary supports 111 and the plurality of secondary supports 112. Then, a transferring speed is set for the panel transferring apparatus 10 to transfer the panel 13 from position 1 to position 2.

As compared to the prior art, the panel transferring apparatus and the panel supporting mechanism thereof of the present invention have a plurality of secondary supports 112 disposed at both sides of the primary supports 111 to increase a contact area between the panel supporting mechanism 11 and the panel 13. This lessens the flexure of the panel 13 on the panel supporting mechanism 11, so fracture of the panel 13 caused by an inertia force when the panel 13 is put down or lifted up by the panel transferring apparatus 10 is reduced; furthermore, the speed at which the panel transferring apparatus 10 drives the panel 13 remains unchanged.

According to the above descriptions, the panel transferring apparatus and the panel supporting mechanism thereof of the present invention have a plurality of secondary supports disposed on the primary supports to increase a contact area between the panel supporting mechanism and the panel. This lessens the flexure of the panel, lowers the production cost and shortens the production cycle. Thereby, the competitive edge of the manufacturers is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A panel transferring apparatus, wherein the panel transferring apparatus comprises a panel supporting mechanism for supporting a panel, the panel supporting mechanism comprising:

a plurality of primary supports extending in a first direction and spaced apart from each other in a second direction perpendicular to the first direction; and a plurality pairs of secondary supports disposed on each of the primary supports and extending in the second direction, wherein each pair of secondary supports symmetrically extend from two opposite sides of the corresponding primary support, and the second supports disposed at a same side of the corresponding primary support are spaced apart from each other, the primary supports and the secondary supports cooperate to support the panel.

2. The panel transferring apparatus of claim 1, wherein a distance to which the secondary supports extend laterally is smaller than a spacing between every two adjacent primary supports.

3. The panel transferring apparatus of claim 1, wherein the panel supporting mechanism further comprises a fixing element, each of the primary supports comprises a free end and a fixed end opposite to each other, and the fixed end of the primary support is fixed to the fixing element.

4. The panel transferring apparatus of claim 3, wherein each of the primary supports is tapered from the fixed end to the free end.

5. The panel transferring apparatus of claim 3, wherein the panel transferring apparatus further comprises a drive mechanism which is pivotally connected to the fixing element, the drive mechanism comprises a first drive element, a second drive element, a third drive element, a fourth drive element, an L-shaped fifth drive element and a supporting platform, one end of the first drive element is pivotally connected to the fixing element, one end of the second drive element is pivotally connected to the other end of the first drive element, one end of the third drive element is pivotally connected to the other end of the second drive element, one end of the fourth drive element is pivotally connected to the other end of third drive element, one end of the fifth drive element is pivotally connected to the other end of the fourth drive element, and the other end of the fifth drive element is pivotally connected to the supporting platform.

6. The panel transferring apparatus of claim 1, wherein the plurality of primary supports and the plurality of secondary supports are integrally formed or separately formed.

7. The panel transferring apparatus of claim 1, wherein the plurality pairs of the secondary supports extend co-linearly.

8. A panel supporting mechanism for supporting a panel, comprising:

a plurality of primary supports spaced apart from each other; and a plurality pairs of secondary supports disposed on each of the primary supports and perpendicularly extending to the primary supports, wherein the primary supports and the secondary supports cooperate to support the panel, each pair of secondary supports symmetrically extend from two opposite sides of the corresponding primary support, and the second supports disposed at a same side of the corresponding primary support are spaced apart from each other, the primary supports and the secondary supports cooperate to support the panel.

9. The panel supporting mechanism of claim 8, wherein a distance to which the secondary supports extend laterally is smaller than a spacing between every two adjacent primary supports.

10. The panel supporting mechanism of claim 8, wherein the panel supporting mechanism further comprises a fixing element, each of the primary supports comprises a free end and a fixed end opposite to each other, and the fixed end of the primary support is fixed to the fixing element.

11. The panel supporting mechanism of claim 10, wherein each of the primary supports is tapered from the fixed end to the free end.

12. The panel supporting mechanism of claim 8, wherein the plurality of primary supports and the plurality of secondary supports are integrally formed or separately formed.

13. The panel supporting mechanism of claim 8, wherein the plurality pairs of the secondary supports extend co-linearly.

* * * * *